United States Patent [19]

Feigenbutz et al.

[11] Patent Number: 5,423,007
[45] Date of Patent: Jun. 6, 1995

[54] MULTIPROCESSOR COMPUTER SYSTEM HAVING IMPROVED COUPLING ARRANGEMENT FOR INDEPENDENTLY OPERATING LOCAL PROCESSOR SYSTEMS

[75] Inventors: Michael Feigenbutz, Heidelberg; Michael Faulhaber, Mannheim, both of Germany

[73] Assignee: Teldix GmbH, Heidelberg, Germany

[21] Appl. No.: 824,236

[22] Filed: Dec. 4, 1991

[30] Foreign Application Priority Data

May 31, 1989 [DE] Germany .................. 39 17 715.7

[51] Int. Cl.⁶ .................................................. G06F 9/46
[52] U.S. Cl. ..................................... 395/325; 395/275;
364/230.2; 364/232.7; 364/241.2; DIG. 1/242.92; DIG. 1/229.2
[58] Field of Search ............... 395/275, 575, 200, 700, 395/550, 325, 725, 800

[56] References Cited

U.S. PATENT DOCUMENTS

| 4,099,233 | 7/1978 | Barbagelata et al. | 364/200 |
|---|---|---|---|
| 4,371,928 | 2/1983 | Barlow et al. | 395/425 |
| 4,387,427 | 6/1983 | Cox et al. | 395/200 |
| 4,610,013 | 9/1986 | Long et al. | 371/9.1 |
| 4,661,902 | 4/1987 | Hochsprung et al. | 395/800 |
| 4,750,111 | 6/1988 | Crosby, Jr. et al. | 395/550 |
| 4,769,771 | 9/1988 | Lippmann et al. | 395/200 |
| 4,805,106 | 2/1989 | Pfeifer | 364/200 |
| 4,816,989 | 3/1989 | Finn et al. | 395/200 |
| 4,821,170 | 4/1989 | Bernick et al. | 395/275 |
| 4,831,523 | 5/1989 | Lewis et al. | 395/275 |
| 4,858,173 | 8/1989 | Stewart et al. | 395/725 |
| 4,910,666 | 3/1990 | Nibby, Jr. et al. | 395/575 |
| 4,937,784 | 6/1990 | Masai et al. | 395/325 |
| 4,941,089 | 7/1990 | Fischer | 364/200 |
| 4,945,475 | 7/1990 | Bruffey et al. | 395/600 |
| 5,027,271 | 6/1991 | Curley et al. | 395/725 |
| 5,029,074 | 7/1991 | Maskas et al. | 395/325 |
| 5,067,071 | 11/1991 | Schanin et al. | 395/275 |
| 5,113,496 | 5/1992 | McCalley et al. | 395/200 |
| 5,113,498 | 5/1992 | Evan et al. | 395/200 |
| 5,113,522 | 5/1992 | Dinwiddie, Jr. et al. | 395/700 |
| 5,125,076 | 6/1992 | Faber et al. | 395/200 |
| 5,142,683 | 8/1992 | Burkhardt, Jr. et al. | 395/725 |
| 5,150,464 | 9/1992 | Sidhu et al. | 395/200 |
| 5,163,138 | 11/1992 | Thirumalai | 395/325 |
| 5,179,715 | 1/1993 | Andoh et al. | 395/800 |
| 5,185,864 | 2/1993 | Bonevento et al. | 395/725 |
| 5,187,799 | 2/1993 | McAuley et al. | 395/800 |
| 5,191,651 | 3/1993 | Holim et al. | 395/200 |
| 5,201,053 | 4/1993 | Benhase et al. | 395/725 |
| 5,210,828 | 5/1993 | Bolan et al. | 395/200 |
| 5,274,797 | 12/1993 | Barlow et al. | 395/575 |

FOREIGN PATENT DOCUMENTS

| 0166272 | 1/1986 | European Pat. Off. |
|---|---|---|
| 0240667 | 10/1987 | European Pat. Off. |
| 0311705 | 4/1989 | European Pat. Off. |
| 0318270 | 5/1989 | European Pat. Off. |
| 3917715 | 12/1990 | Germany. |
| WO90/25387 | 12/1990 | WIPO. |

OTHER PUBLICATIONS

Funk et al, "VMEbus-Konfigurationen mit 68020-Mastern im Vergleich", Design & Elektronik, Edition 8, Apr. 18, 1989, pp. 66–68.

Rose et al, "FERMTOR: A Tunable Multiprocessor Architecture", IEEE Micro 5 (1985) Aug No. 4, pp. 5–17.

Primary Examiner—Allen R. MacDonald
Assistant Examiner—Tariq R. Hafiz
Attorney, Agent, or Firm—Spencer, Frank & Schneider

[57] ABSTRACT

A computer system having a plurality of mutually independently operating processor systems, coupling elements and a system bus which connects the processor systems and a central decision logic unit for administering the system bus. The computer system includes at least two processor subsystems that are connected by the system bus and each includes a plurality of the independently operating local processor systems. The local processor systems of a processor subsystem are connected with one another or with the system bus by way of a coupling element. A decision logic unit within the coupling element here determines, as a function of a fixed priority rule, the sequence of processing of communications requests.

14 Claims, 1 Drawing Sheet

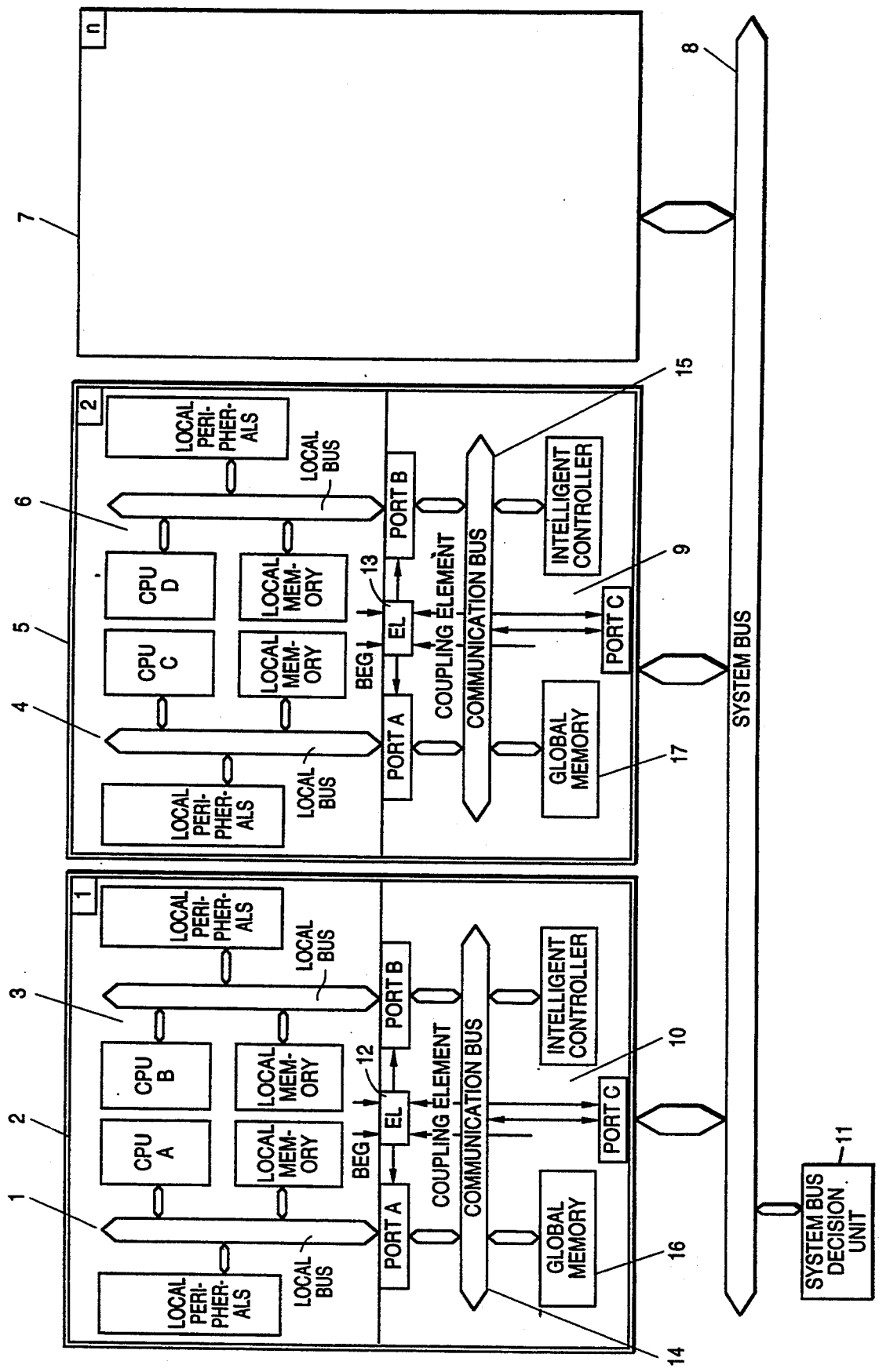

MULTIPROCESSOR COMPUTER SYSTEM HAVING IMPROVED COUPLING ARRANGEMENT FOR INDEPENDENTLY OPERATING LOCAL PROCESSOR SYSTEMS

CROSS REFERENCE TO RELATED APPLICATIONS

This application is a continuing application of international application PCT/EP90/00758, filed May 11, 1990, wherein the United States of America was designated. The international application and the instant application claim the priority right, under 35 U.S.C. 119, of Application P 3,917,715.7 filed in Germany on May 31, 1989. The international and German applications are incorporated herein by reference.

BACKGROUND OF THE INVENTION

The invention relates to a computer system which includes a plurality of independently operating local processor systems that are combined into a plurality of processor subsystems, a central system bus decision logic unit, and a system bus which connects the processor subsystems with the central system bus decision logic unit, with at least two of the processor subsystems including at least two independently operating local processor systems which can be selectively connected with the system bus through a coupling element.

In the computer art, the working of parallel processes and the optimum utilization of time increasingly requires the combination of several processors into multiprocessor systems. The processors included in these systems are usually adapted to special applications and are able to operate essentially independently of one another. However, it is absolutely necessary for these processors to communicate with one another within the system. Generally, this is accomplished by standardized parallel system bus architectures which operate in a time-sharing mode (e.g. VME [Versa Module Europe] bus). With an increasing number of processors, the required communication between these processors becomes more and more extensive. This raises the danger of the system bus becoming a bottleneck for data communications.

EP-A1-0,311,705 discloses a computer system which includes mutually independently operating processor systems each having two mutually independently operating local processor systems, a coupling element and a memory, a decision logic unit, several main memories and a system bus. The system bus connects the decision logic unit, the coupling elements and the main memories with one another.

The local processor systems of a processor system can be connected with the system bus by way of the coupling element.

EP-A2-0,318,270 discloses the networking of multiprocessor systems as it is customary for larger computer systems.

The multi-processor system disclosed here includes several groups of processors. The processors of one group are connected with the memory control unit. The individual groups may have further associated memory and service units which are likewise connected with the memory control unit. All memory control units of the individual groups are again connected with a higher order control unit which coordinates the connections between individual groups.

SUMMARY OF THE INVENTION

It is an object of the present invention to arrange data transport in parallel and to reduce the load on the system bus.

The above object generally is accomplished by a computer system which comprises a plurality of independently operating processor systems that are combined into a plurality of processor subsystems, a central system bus decision logic unit, and a system bus which connects the processor subsystems with the central system bus decision logic unit, with at least two of the processor subsystems including at least two of the independently operating local processor systems which can be connected with the system bus by way of a coupling element, if required; and wherein the local processor systems of a processor subsystem can also be connected with one another through the coupling element, and a decision logic unit of the coupling element determines, as a function of a fixed priority rule, the sequence of processing of communications requests by the local processor systems and the next connection to be established via the coupling element.

Preferably each coupling element includes, in addition to the decision logic unit of the respective coupling element, at least three inputs/outputs (ports), a global memory and a communications bus.

Advantages of the invention are, for example:

that data can be exchanged more quickly between individual processor systems with a simultaneously reduced load on the system bus. This is realized in that processor systems which are required to mutually exchange large quantities of data are disposed in the same processor subsystem and communicate with the aid of a coupling element. This means a significantly faster data exchange compared to the use of a global system bus. At the same time, this bus remains available for other tasks; and that it is possible to connect the coupling element in a transparent manner so that each processor system is able to communicate with other system components by way of the system bus.

Further advantages of the invention will become evident from the dependent claims and the specification.

In the computer system according to the invention, several processor subsystems are provided, each having at least two associated substantially independently operating local processor systems. The processor subsystems are connected with one another by way of the system bus and are able to communicate by way of the system bus with one another and with other possibly existing system components such as, for example, input-/output component groups. The system bus may be administered by a central system bus decision logic unit.

The local processor systems of a processor subsystem are connected with one another and with the system bus by way of a coupling element, with a decision logic unit within the coupling element determining the sequence of processing of communications requests as a function of a fixed priority rule.

The coupling element includes a decision logic unit for determining the processing of communications requests, gates (so-called ports) for the connection of the local processor systems and the system bus, a global memory for the storage of communications data and/or for the storage of the programs and data of a controller possibly included in the coupling element. The coupling element further includes a communications bus for connecting the components contained in the coupling element.

BRIEF DESCRIPTION OF THE DRAWING FIGURE

The invention will now be described with reference to a drawing FIGURE.

The sole drawing FIGURE shows an embodiment of a computer system according to the invention.

DETAILED DESCRIPTION OF THE PREFERRED EMBODIMENT

The computer system is composed of a plurality of processor subsystems 2, 5, 7 which are connected with one another by way of a system bus 8 and with a system bus decision logic unit 11 associated with the computer system. The processor subsystems 2, 5, 7 each include a coupling element 9, 10, . . . , and two local processor systems 1, 3; 4, 6, with each processor subsystem 2, 5, 7 being combined into a component group on a card. Of course, a computer system may include more processor subsystems and a processor subsystem 2, 5, 7 may include more local processor systems 1, 3; 4, 6.

A local processor system 1, 3; 4, 6 includes all elements required for the independent operation of a processor system, such as a local processor, local memory, local bus and possibly local peripherals.

As in the illustrated example, processor subsystems 2, 5, 7 may all have the identical configuration or they may be equipped with different elements. For example, it is possible for coupling element 9, 10 not to have a global memory or no intelligent controller. If, for example, the local processor system 1 wishes to communicate with local processor system 3, the decision logic unit 12 of the coupling element 10 associated with processor subsystem 2 recognizes this fact. The decision logic unit 12 of coupling element 10 waits until the communications bus 14 of coupling element 10 is available.

If the communications bus is available, that is, no other processor happens to access the communications bus 14 and the global memory 16 of coupling element 10 at the moment, decision logic unit 12 enables port A and keeps ports B and C closed, global memory 16 is selected and local processor 1 accesses global memory 16. Decision logic unit 12 may initiate an interruption of the presently running program in local processor 3 to inform the latter that new data are available in global memory 16.

In the same manner, the local processor system 4 of the illustrated computer system is able to communicate with the local processor system 6 in processor subsystem 5.

The communication between local processor systems 1 and 3 and 4 and 6 of processor subsystems 2 and 5 is made possible by the respective coupling elements 10 and 9 without charging the system bus 8.

If the local processor system 1 of processor subsystem 2 wishes to communicate with the local processor system 4 of processor subsystem 5, this is detected by the decision logic unit of coupling element 10 and by the system bus decision logic unit 11.

The system bus decision logic unit 11 waits until the system bus 8 is available and then assigns system bus 8. Decision logic unit 12 of coupling element 10 enables ports A and C of coupling element 10 and keeps port B closed. Coupling element 10 thus becomes transparent for local processor 1. The address of local processor system 4 is switched through onto system bus 8. As soon as the communications bus 15 of coupling element 9 is available, decision logic unit 13 enables port C of coupling element 9 and keeps ports A and B closed. The global memory 17 of coupling element 9 is selected and the local processor system 1 of processor subsystem 2 accesses global memory 17. Here again, the local processor system 1 is able to initiate an interruption of the presently running program in local processor system 4 in order to inform the local processor system 4 that new data are available in global memory 17.

Communication between local processors 1 and 4 is performed via the transparent coupling elements 9 and 10 without charging the local processor systems 3 and 6.

For the case where an existing intelligent controller of coupling element 10 wishes to transfer data from global memory 16 to global memory 17 of coupling element 9 by way of system bus 8, the intelligent controller of coupling element 10 addresses global memory 16 as soon as communications bus 14 is assigned to it and reads the desired data. Ports A, B and C of coupling element 10 are then closed. After the data transfer, the intelligent controller of coupling element 10 addresses global memory 17 as soon as system bus 8 is assigned to it. The decision logic unit 12 of coupling element 10 then enables port C and keeps ports A and B closed.

The address of global memory 17 in coupling element 9 is switched through to the system bus 8. The decision logic unit 13 of coupling element 9 enables port C and keeps ports A and B closed. The intelligent controller of coupling element 10 is able to transfer its data into global memory 17 of coupling element 9. The local busses are not charged during the data transfer.

If a coupling element 9,10 or system bus 8 are temporarily not available due to the access of another processor waiting cycles are initiated automatically.

All data transfers are effected by general transfer instructions, addressing source and target. All described mechanisms can be realized as hardware and do not require the adherence to special protocols on the part of the programmer.

It will be understood that the above description of the present invention is susceptible to various modifications, changes and adaptations, and the same are intended to be comprehended within the meaning and range of equivalents of the appended claims.

What is claimed is:

1. A computer system comprising:
   a plurality of independently operating local processor systems that are combined into a plurality of processor subsystems;
   a central system bus decision logic unit;
   a system bus which connects the processor subsystems with one another and with the central system bus decision logic unit; and wherein each of at least two of the processor subsystems includes at least two different of the independently operating local processor systems which are connected with the system bus via a respective coupling element,
   the local processor systems of a respective processor subsystem are also connected with one another via the respective coupling element, and
   a respective coupling decision logic unit is disposed in each of the coupling elements and determines, as a function of a fixed priority rule, the sequence of processing of communications requests by the respective associated independently operating local processor systems and the next connection to be established via the respective coupling element.

2. A computer system according to claim 1, wherein each coupling element includes, in addition to the respective coupling decision logic unit of the coupling element: at least three inputs/outputs respectively connected to two different ones of the at least two local independently operating processor systems of the respective processor subsystem and to the system bus; a global memory; and a communications bus interconnecting the global memory and the at least three inputs/outputs.

3. A computer system according to claim 2, wherein the respective at least three inputs/outputs of each coupling element are actuatable independently of one another by the respective coupling decision logic unit.

4. A computer system according to claim 2, wherein the global memory of each coupling element also serves for the intermediate storage of information from each local processor system.

5. A computer system according to claim 1, wherein the coupling element further includes an intelligent controller which is able to transfer data over the system bus.

6. A computer system comprising:
a plurality of independently operating local processor systems that are arranged in a plurality of processor subsystems, with at least two of said processor subsystems each including at least two of said independently operating local processor systems;
a central system bus decision logic unit;
a system bus which connects said processor subsystems with each other and with the central system bus decision logic unit; and
a respective coupling means, disposed in each of said at least two of said processor subsystems, for selectively connecting said local processor systems of a respective said processor subsystem either with one another or to said system bus, with each said coupling means including a respective coupling decision logic unit for determining, as a function of a fixed priority rule, the sequence of processing of communications requests by the local processor systems of said computer system and for controlling the next connection to be established via the respective said coupling means.

7. A computer system according to claim 6, wherein each said coupling means includes, in addition to the respective said coupling decision logic unit, at least three input/output ports, a global memory, and a respective communications bus interconnecting said global memory and said input/output ports of the respective said coupling means.

8. A computer system according to claim 7, wherein: each of said local processor systems of said at least two of said processor subsystems is connected to a respective one of said input/output ports of the associated respective said coupling means; and a further of said input/output ports of each of said coupling means is connected to said system bus.

9. A computer system according to claim 8, wherein: said at least three input/output ports of the respective said coupling means are actuatable independently of one another by said coupling decision logic unit; and each said coupling means can selectively couple the respective global memory to said system bus or to the respective said local processor systems of the respective said processor subsystem.

10. A computer system according to claim 9, wherein at least one of said coupling means includes an intelligent controller which is connected to the respective said communications bus and which is able to transfer data over said system bus via said further of said input/output ports.

11. A computer system comprising:
a system bus;
a plurality of processor subsystems connected to the system bus, with at least two of said subsystems each including at least two local independently operating processor systems;
a central system bus decision logic unit connected to the system bus for controlling data flow between said subsystems via said system bus; and,
a respective coupling means disposed in such of said at least two of said subsystems for selectively coupling said at least two local independent processor systems of a respective subsystem either with one another or to said system bus, and with each said coupling means including a respective coupling decision logic unit for determining, as a function of a fixed priority rule, the sequence of processing of communication requests by and for the said two local processor systems of the respective said processor subsystem and for controlling the next connection to be established by the respective said coupling means.

12. A computer system according to claim 11, wherein each said coupling means includes, in addition to the respective said coupling decision logic unit, at least three input/output ports, a global memory and a respective communications bus; and wherein: each of said local processor systems of said at least two of said processor subsystems is connected to a respective one of said input/output ports of the associated respective said coupling means; a further of said input/output ports of each of said coupling means is connected to said system bus; and each respective said communication bus is connected to each of said input/output ports and to said global memory of the respective associated one of said coupling means.

13. A computer system according to claim 12, wherein: said at least three input/output ports of the respective said coupling means are actuatable independently of one another by said coupling decision logic unit of the respective said coupling means; and each said coupling means can selectively couple the respective global memory to said system bus or to said local processor systems of the respective said processor subsystem.

14. A computer system according to claim 13, wherein at least one of said coupling means includes an intelligent controller which is connected to the respective said communications bus and which is able to transfer data over said system bus via said further of said input/output ports.

* * * * *